(12) United States Patent
Martin (10) Patent No.: US 10,055,662 B2
(45) Date of Patent: Aug. 21, 2018

(54) DETECTING FACIAL LIVELINESS

(71) Applicant: MorphoTrust USA, LLC

(72) Inventor: Brian Martin, McMurray, PA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 15/864,434

(22) Filed: Jan. 8, 2018

(65) Prior Publication Data

US 2018/0150708 A1  May 31, 2018

Related U.S. Application Data

(63) Continuation of application No. 14/985,780, filed on Dec. 31, 2015, now Pat. No. 9,886,639.

(60) Provisional application No. 62/098,575, filed on Dec. 31, 2014.

(51) Int. Cl.
*G06K 9/00* (2006.01)

(52) U.S. Cl.
CPC ..... *G06K 9/00906* (2013.01); *G06K 9/00221* (2013.01); *G06K 9/00604* (2013.01); *G06K 9/00912* (2013.01)

(58) Field of Classification Search
None
See application file for complete search history.

(56) References Cited

U.S. PATENT DOCUMENTS

| | | | |
|---|---|---|---|
| 7,801,335 B2 * | 9/2010 | Hanna | G06K 9/00604 382/115 |
| 8,260,008 B2 * | 9/2012 | Hanna | G06K 9/00604 382/100 |
| 8,280,120 B2 * | 10/2012 | Hoyos | G06K 9/00107 340/5.53 |
| 8,364,971 B2 * | 1/2013 | Bell | G06F 21/32 382/117 |
| 8,457,367 B1 | 6/2013 | Sipe et al. | |
| 8,542,879 B1 * | 9/2013 | Nechyba | G06K 9/00228 382/103 |
| 8,798,330 B2 * | 8/2014 | Hanna | G06K 9/00604 382/115 |

(Continued)

FOREIGN PATENT DOCUMENTS

WO  WO 2005/008566  1/2005

OTHER PUBLICATIONS

International Preliminary Report on Patentability for International Application No. PCT/US2015/068357, dated Jul. 13, 2017, 12 pages.

(Continued)

*Primary Examiner* — Soo Park
(74) *Attorney, Agent, or Firm* — Fish & Richardson P.C.

(57) ABSTRACT

Methods, systems, and computer-readable storage mediums for detecting facial liveliness are provided. Implementations include actions of processing a facial image of a subject to determine a corneal reflection of an illuminator adjacent to the subject, the facial image being captured at a time point, determining an expected corneal reflection of the illuminator based on an illumination of the illuminator at the time point, comparing the determined corneal reflection of the illuminator to the expected corneal reflection of the illuminator to obtain a comparison result, and determining facial liveliness of the subject based on the comparison result.

20 Claims, 5 Drawing Sheets

(56) References Cited

U.S. PATENT DOCUMENTS

| | | | |
|---|---|---|---|
| 8,818,051 B2* | 8/2014 | Hoyos | G06K 9/00107 382/117 |
| 8,818,052 B2* | 8/2014 | Hoyos | G06K 9/00107 382/117 |
| 9,003,196 B2* | 4/2015 | Hoyos | H04L 63/10 713/186 |
| 9,008,375 B2* | 4/2015 | Malhas | G06K 9/00906 382/117 |
| 9,058,519 B2* | 6/2015 | Law | G06K 9/00597 |
| 9,313,200 B2* | 4/2016 | Hoyos | H04L 63/0861 |
| 9,355,299 B2* | 5/2016 | Hoyos | G06K 9/00107 |
| 9,613,281 B2* | 4/2017 | Hanna | G06K 9/00906 |
| 9,672,341 B2* | 6/2017 | Danikhno | G06F 21/32 |
| 9,792,499 B2* | 10/2017 | Hanna | G06K 9/00617 |
| 2006/0279726 A1 | 12/2006 | Galambos | |
| 2007/0019862 A1* | 1/2007 | Kakiuchi | G06K 9/00255 382/190 |
| 2007/0110285 A1* | 5/2007 | Hanna | G06K 9/00604 382/117 |
| 2010/0299530 A1 | 11/2010 | Bell | |
| 2011/0007949 A1 | 1/2011 | Hanna et al. | |
| 2013/0212655 A1 | 8/2013 | Hoyos et al. | |
| 2014/0044321 A1 | 2/2014 | Derakhshani et al. | |
| 2014/0169642 A1 | 6/2014 | Law | |
| 2014/0196143 A1* | 7/2014 | Fliderman | G06F 21/32 726/19 |
| 2014/0307929 A1 | 10/2014 | Nechyba et al. | |
| 2016/0019420 A1* | 1/2016 | Feng | G06K 9/00604 382/117 |
| 2016/0019421 A1* | 1/2016 | Feng | G06K 9/00604 382/117 |
| 2016/0026862 A1* | 1/2016 | Anderson | H04N 5/23229 382/117 |
| 2016/0057138 A1 | 2/2016 | Hoyos et al. | |
| 2016/0117544 A1 | 4/2016 | Hoyos | |
| 2016/0125178 A1 | 5/2016 | Danikhno | |
| 2017/0103276 A1* | 4/2017 | Rauhala | G06K 9/00906 |
| 2017/0206413 A1 | 7/2017 | Hanna | |

OTHER PUBLICATIONS

International Search Report and Written Opinion for Application No. PCT/US2015/068357, dated Mar. 18, 2016, 13 pages.

* cited by examiner

DETECTING FACIAL LIVELINESS

CROSS-REFERENCE TO RELATED APPLICATION

This application is a continuation of U.S. application Ser. No. 14/985,780 filed Dec. 31, 2015 which claims priority under 35 USC § 119(e) to U.S. Provisional Patent Application Ser. No. 62/098,575, filed on Dec. 31, 2014, the entire contents of which is hereby incorporated by reference.

FIELD

This disclosure generally relates to computer-based authentication.

BACKGROUND

Transactions between a consumer and a merchant may be subject to risks of identity theft, identity fraud, spoofing, phishing, etc., all of which may potentially hinder the flow of commerce.

SUMMARY

Implementations of the present disclosure include computer-implemented methods for detecting facial liveliness. In general, one innovative aspect of the subject matter described in this disclosure can be implemented in methods that include the actions of processing a facial image of a subject to determine a corneal reflection of an illuminator adjacent to the subject, the facial image being captured at a time point, determining an expected corneal reflection of the illuminator based on an illumination of the illuminator at the time point, comparing the determined corneal reflection of the illuminator to the expected corneal reflection of the illuminator to obtain a comparison result, and determining facial liveliness of the subject based on the comparison result.

These and other implementations can each optionally include one or more of the following features: comparing the determined corneal reflection of the illuminator to the expected corneal reflection of the illuminator can include: correlating the determined corneal reflection of the illuminator to the expected corneal reflection of the illuminator; scoring a matching quality based on a result of the correlation; and comparing the scored matching quality to a predetermined threshold. Determining facial liveliness of the subject can include determining that the face of the subject is live in response to determining that the scored matching quality is beyond the predetermined threshold. Determining a corneal reflection of the illuminator can include determining the corneal reflection of the illuminator in at least one of: color, shape, position, or pattern.

The actions can include activating the illuminator to illuminate based on an illumination pattern. In some examples, the actions include generating the illumination pattern for the illuminator. In some examples, activating the illuminator comprises: activating the illuminator in response to determining that the subject chooses to use liveliness verification for biometric authentication.

The illuminator can include two or more illumination sources with respective colors and at respective positions, respectively. In some implementations, the illumination of the illuminator is based on a temporal illumination pattern of the two or more illumination sources. The two or more illumination sources can generate illumination in bursts each with respective temporal durations. At least one of the two or more illumination sources can have different illumination shapes for different temporal durations. In some implementations, the illumination of the illuminator is based on a spatial illumination pattern of the two or more illumination sources. Each of the two or more illumination sources can have an illumination on or off state.

In some examples, the illuminator includes one or more physical light sources each at respective light wavelengths. In some examples, the illuminator includes one or more digital illumination sources displayed on a screen to provide respective illumination colors. The actions can include generating the digital illumination sources. The illuminator can be positioned such that illumination from the illuminator is incident on an eye of the subject at an angle. The actions can include prompting the subject to change a relative position of the illuminator and the eye of the subject.

The actions can include receiving at least a portion of a video stream feed from a camera device, the portion of the video stream feed including facial images of the subject captured by the camera device at sequential time points. The action can further include: processing a second facial image of the subject to determine a second corneal reflection of the illuminator, the second facial image being captured at a second time point sequential to the time point for the first facial image; determining a second expected corneal reflection of the illuminator based on a second illumination of the illuminator at the second time point, the second illumination being different from the first illumination; comparing the determined second corneal reflection of the illuminator to the expected second corneal reflection of the illuminator to obtain a second comparison result; and determining facial liveliness of the subject based on the comparison result and the second comparison result.

The actions can include transmitting the determined facial liveliness of the subject to a computing device at identity provider. The actions can also include transmitting, to a computing device at identity provider, an authentication request of the subject for accessing an account managed by a relying party different from the identity provider, the authentication request including biometric data of the subject and the determined facial liveliness of the subject.

Another innovative aspect of the subject matter described in this disclosure can be implemented in methods that include the actions of processing first and second facial images of a subject to determine first and second corneal reflections of an illuminator adjacent to the subject, the first and second facial images being captured at first and second sequential time points, respectively; determining a corneal reflection change of the illuminator based on the determined first and second corneal reflections; comparing the determined corneal reflection change of the illuminator to an illumination change of the illuminator associated with the first and second sequential time points; and determining facial liveliness of the subject based on a result of the comparison.

These and other implementations can each optionally include one or more of the following features: the actions can include activating the illuminator to change illumination of the illuminator based on the illumination change. The illumination change of the illuminator can include at least one of: an illumination color change, an illumination shape change, an illumination position change, an illumination on/off state change, or an illumination temporal duration change. Determining a corneal reflection change of the illuminator can include determining a change of the corneal reflection of the illuminator in at least one of: color, shape, position, on/off state, or temporal duration.

The illuminator can include at least one of: one or more physical light sources each at respective light wavelengths, or one or more digital illumination sources displayed on a screen to provide respective illumination colors. In some implementations, the illuminator includes first and second illumination sources with first and second colors and at first and second positions, respectively. In some examples, the illumination change of the illuminator includes a change of a temporal illumination pattern of the first and second illumination sources, and the first and second illumination sources can generate illumination in bursts each with respective temporal durations. At least one of the first illumination source or the second illumination source can change an illumination shape for different temporal durations. In some examples, the illumination change of the illuminator includes a change of a spatial illumination pattern of the first and second illumination sources over time, and at least one of the first illumination source or the second illumination source can change an illumination on/off state over time.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Proof of identity may present a perennial challenge in our daily transactions. With the advent of the Internet, comes the age of e-commerce in which on-line transactions may replace in-person transactions. However, the sheer volume and complexity of these on-line transactions may give rise to a digital world fraught with peril, including, for example, identity theft, identity fraud, spoofing, phishing, etc. Notably, such risks may not be new in the Internet age, although the Internet may have amplified such risks. As the society moves towards cloud computing, more and more databases may become accessible. Identity data in some databases may be more reliable and robust than others, based on history or tradition. As connectivity becomes ubiquitous and as more identity databases become available on accessible platforms, identity-related data housed therein can be accessed to increase the confidence in the quality of transactions conducted either online and in person. In addition, biometric data submitted on-line can be verified for liveliness to deter spoofing attempts. In some implementations, the liveliness verification can be leverage analysis of real-time corneal reflection to increase confidence in the biometric data being submitted on-line for authentication. Implementations disclosed herein may be extended to enterprise entities other than financial institutions. This application is directed to systems and methods to detect liveliness of a facial representation during, for example, an on-line session between two parties over a network.

Figure 1A:
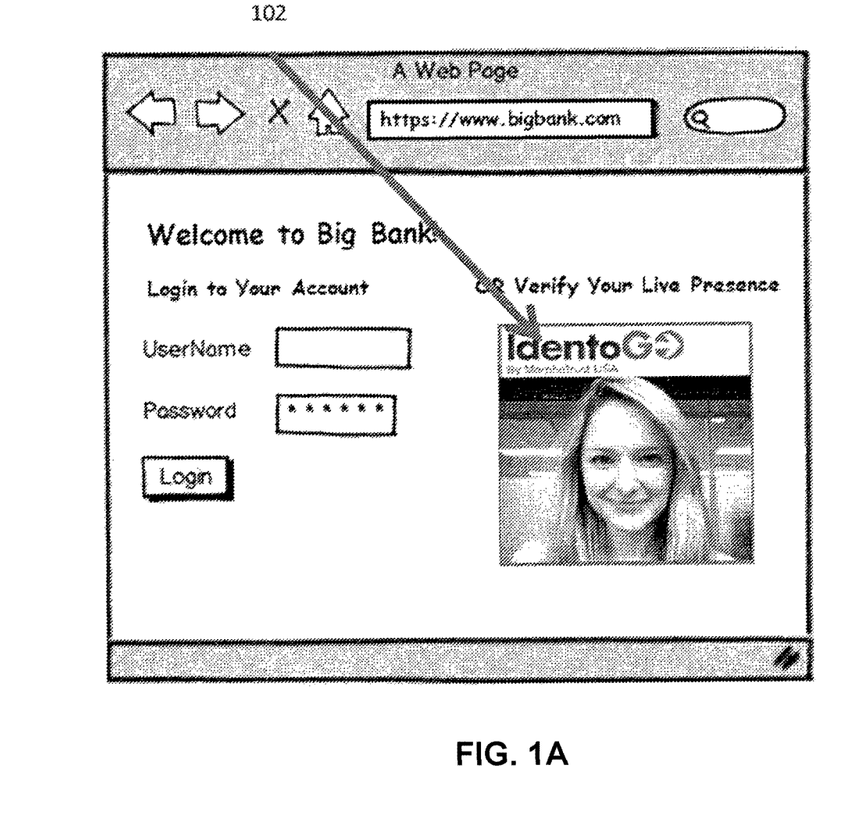
FIG. 1A is a diagram showing an example web site capable of authenticating a user based on a biometric identity of the user according to some implementations.

FIG. 1A is a diagram showing an example web site capable of authenticating a user based on a biometric identity of the user according to some implementations. As illustrated, a user name and password may be required for logging into an account administered by the server hosting the web-site. For example, the server may run an implementation of a hypertext transmission protocol secure (https). In the Internet age, a consumer user may have accounts at dozens of more web-sites, each with disparate requirements of user names and passwords. The consumer user may have a hard time keeping track of user names and passwords at each of the web-sites. Losing track of the registered username or password can hinder on-line access convenience. The consumer user may store the usernames and passwords for each account at a central file. But, access to the central file may be breached, leading to comprises in the stored usernames and passwords. In fact, simple on-line identities including user name and password may be subject to identity theft and identity fraud. A recent survey revealed that identity theft in the United States rose to a three-year high in 2012, with more than 5 percent of the adult population, or 12.6 million people, falling victim to such crimes. The numbers are up from 4.9 percent in 2011 and 4.35 percent in 2010. The incidence of identity theft is only expected to rise. To mitigate the risks arising from identity theft in the context of e-commerce, some implementations, as disclosed herein may choose to authenticate biometric data presented the user on-line. Such biometric data may include, but are not limited to, facial pattern, finger print, palm print, retina scan, iris scan, DNA pattern, voice characteristics, gait analysis. Generally speaking, such biometric data submitted on-line may be in a digital form to facilitate electronic verification. As illustrated by FIG. 1A, biometric login window 102 may be provided by a third-party, different from, for example, the entity that runs bigbank.com. The login window 102 may present the captured facial biometric of the user as the user attempts to log in based on the user's biometric. When the user's biometric data is transmitted for on-line authentication, the biometric data may be encrypted in accordance with industry standard including, for example, data encryption standard (DES), triple-DES, advanced encryption standard (AES), Rivest-Shamir-Adlema (RSA), open pretty good privacy (PGP), etc. In some implementations, the encryptions may be performed on a session-by-session basis in which the session encryption and decryption keys are constantly updated or refreshed to thwart attacks. Note that the terms "liveliness" and "liveness" can be used interchangeably here.

Figure 1B:
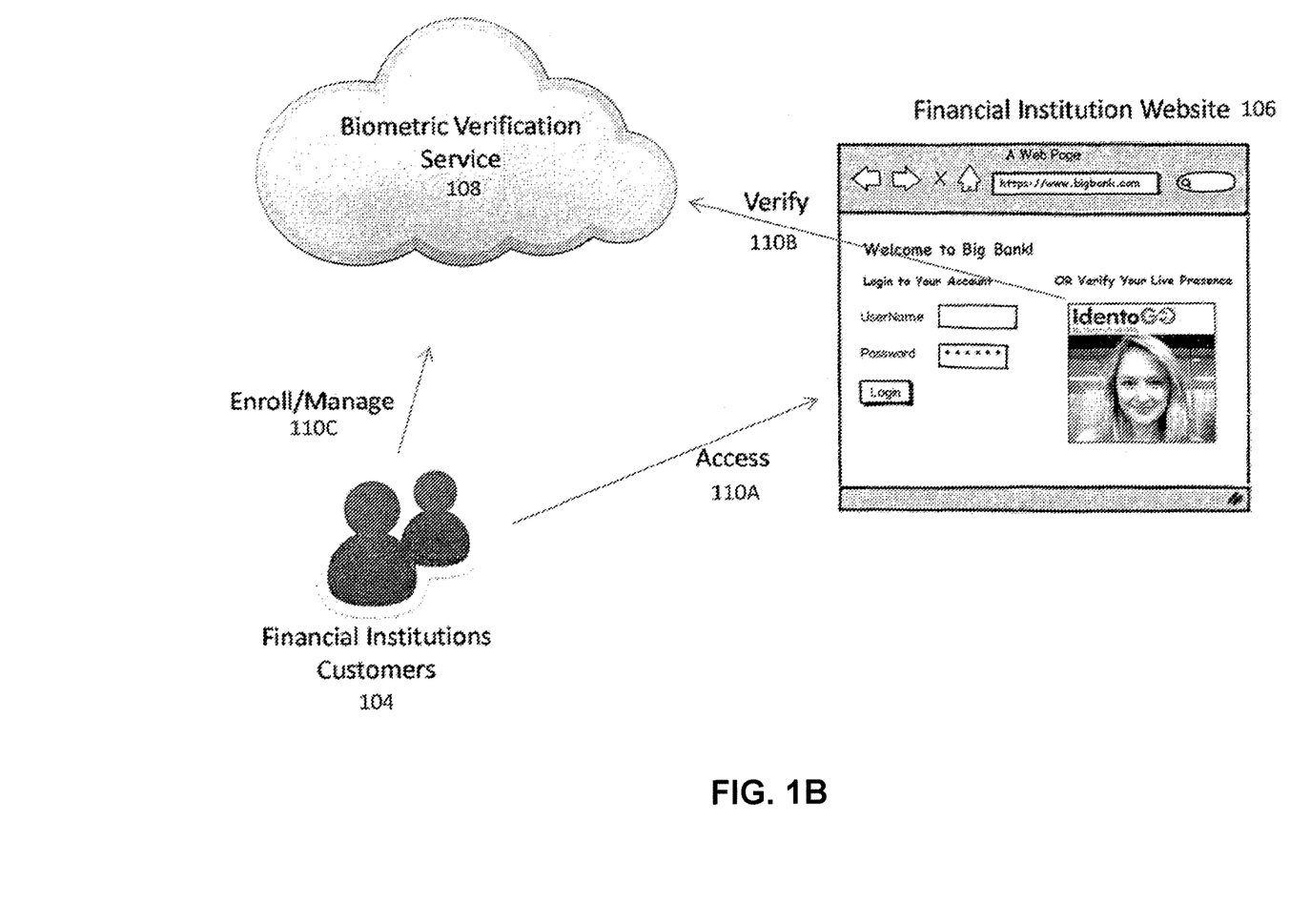
FIG. 1B is a diagram showing an example interaction among a financial institution customer, a financial institution, and a third-party biometric verification service to authenticate a user based on a biometric identity of the user according to some implementations.

At least two issues still remain. The first issue is regarding the vetting process in which a user may register a biometric of the user at a trusted server, for example, a third party server. The second issue is regarding the authentication process in which the liveliness of a biometric presented on-line can be verified to thwart spoofing attempts (for example, someone using a video or photo of the registered user to pretend to be the registered user), or man-in-the-middle attacks. To these ends, FIG. 1B is a diagram showing an example interaction among a financial institution customer, a financial institution, and a third-party biometric verification service to authenticate a user based on a biometric identity of the user according to some implementations. As disclosed herein, the financial institution may include a bank, and may also be known as the relying party. The third-party service provider may also be known as the identity provider.

When a financial institution customer 104 attempts to access an account through the financial institution website 106 (110A), customer 104 may be greeted with the biometric authentication window 102. The financial institution customer 104 may choose to use the biometric authentication. In response to receiving indication from customer 104 that the customer 104 would like to use the biometric authentication 102, the server running the financial institution website 106 may verify the user's authentication request using biometric data at biometric verification service 108 (110B). In some implementations, if customer 104 has never registered a biometric data at the biometric verification service 108, biometric verification service 108 may engage customer 104 to have the customer enrolled (110C). The enrollment process may generally include asking customer 104 to provide a biometric data as the biometric identity data stored/managed by biometric verification service 108. The enrollment process may become part of the vetting process in which biometric verification service further verifies the identity of the customer 104 at other authorities, including, for example, Department of Motor Vehicles (DMV) at the state level and the State Department at the federal level. The authorities may include a credit verification agency, such as, for example, Equifax, Experian, LexisNexis. The credit verification agency may serve as a surrogate of a government-administered authority. After the customer 104 obtains an enrolled biometric identity at the biometric verification service, customer 104 may interact with biometric verification service 108 to conduct routine management of the biometric identity (110C). Routine management may include, for example, replacement of a facial pattern, revocation of an existing facial pattern, etc. Hence, the first issue of a vetting process to register an enrolled biometric data of customer 104 may be addressed.

Regarding the second issue of the liveliness of the biometric data being presented on-line, the biometric login window 102 may authenticate customer 104 by analyzing real-time corneal reflection from illumination sources. As discussed herein, a financial institution may be generalized as a relying party (RP) who may rely on a third party to authenticate that a customer is who the customer purports to be and that the customer is presenting a live facial biometric. The third party, known as the biometric verification service 108 in FIG. 1B, may be generalized as an identity provider (IdP).

Figure 2A:
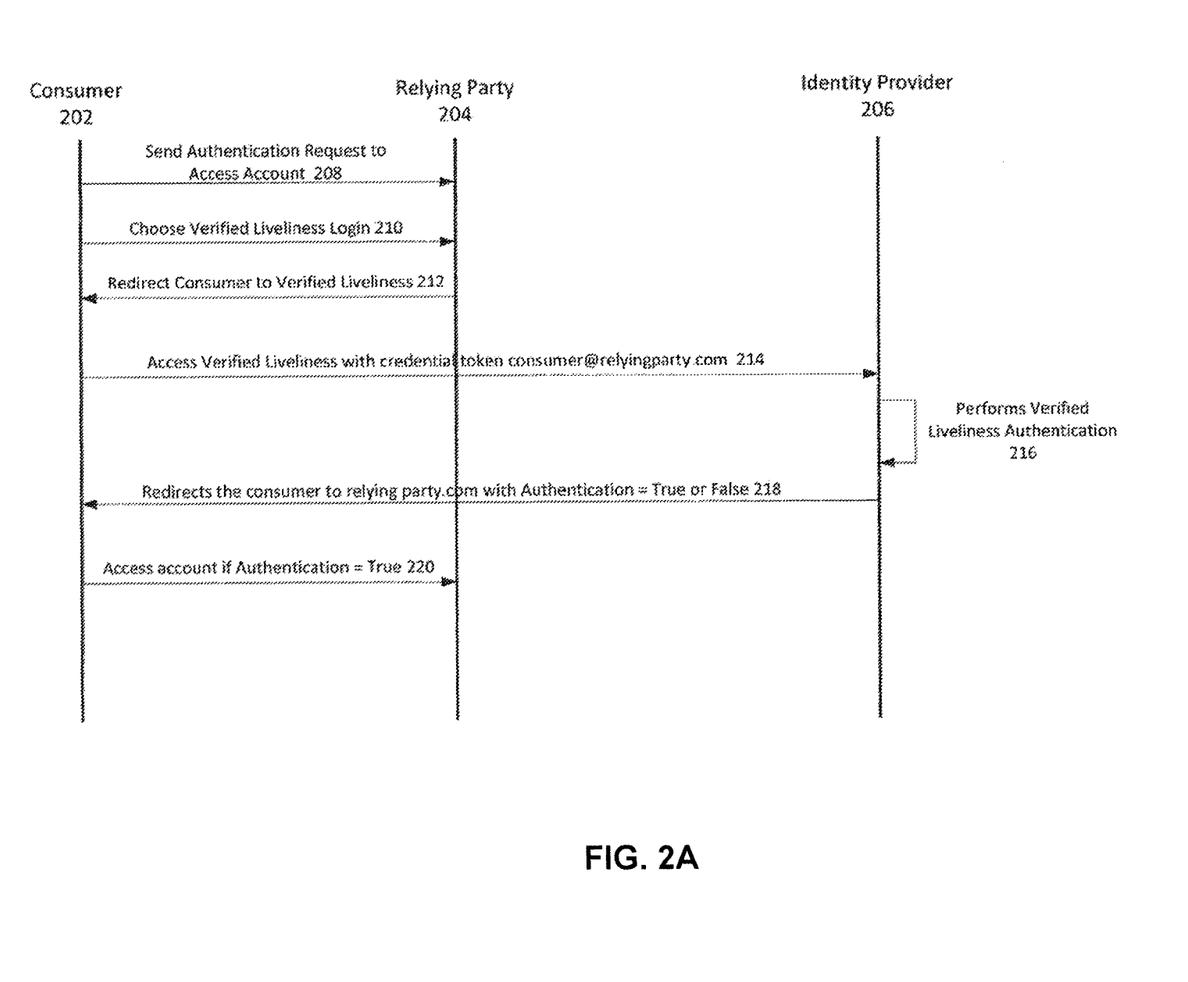
FIG. 2A is a timing diagram showing an example interaction among a consumer, a relying party, and an identity provider in authenticating the consumer when the consumer has enrolled at the identity provider according to some implementations.

With the above generalization, FIG. 2A is a timing diagram showing an example interaction among a consumer 202, a relying party (RP) 204, and an identity provider (IdP) 206 in authenticating the consumer when the consumer has enrolled at the identity provider 206 according to some implementations. The process may initiate with consumer 202 sending an authentication request to access an account managed by relying party 204 (208). In some implementations, the submission of the authentication request may correspond to consumer 202 choosing biometric authentication 102 to access an account managed by, for example, a financial institution.

When the consumer submits the authentication request, the consumer may also choose a verified liveliness login for biometric authentication (210). The verified liveliness login, as disclosed herein, may address the liveliness of biometric data being submitted on-line. For context, using a third-party intermediary to provide an authentication bridge way may be implemented in accordance with industry standards, for example, Security Assertion Markup Language (SAML) and Open standard for Authentication (OAuth).

SAML addresses web browser single sign-on (SSO). Single sign-on solutions may be implemented at the intranet level using, for example, cookies. Extending such single sign-on solutions beyond the intranet has been problematic and has led to the proliferation of non-interoperable proprietary technologies. In the use case addressed by SAML, the user (also known as the principal) may request a service from the relying party (also known as a service provider). The service provider then requests and obtains an identity assertion from the identity provider. On the basis of this identity assertion, the service provider can make an access control decision-deciding whether to perform some service for the connected principal.

In the case of Oauth (including more recent OAuth 2.0), the web application may specifically request a limited access OAuth Token (also known as the valet key) to access the Application Program Interfaces (APIs) on behalf of the user. The valet token may explicitly name the particular rights requested, and the user may not be required to enter a credential. If the user can grant that access, the web application can retrieve the unique identifier for establishing the profile (identity) using the APIs.

Hence, authentication standards may generally provide a single sign-on so that a consumer can use, for example, the consumer's Facebook or Google login credentials to access other accounts (for example, an amazon account, a linked-in account, etc.), typically of the same consumer. Some authentication methodologies as disclosed herein may provide a single authentication proof of identity by using biometric data, for example, using facial biometric.

Referring to FIG. 2A, in response to receiving the consumer choice of verified liveliness login, a server at the relying party may redirect consumer to proceed with verified liveliness (212). Thereafter, consumer 202 may be redirected to a server at the identity provider 206. For example, consumer 202 may submit a request to use verified liveliness by using a credential token in the form of consumer@relying_party.com (214). As illustrated in FIG. 2A, the request may be submitted at a server at identity provider 206.

Upon receiving the request to use verified liveliness, the server at identity provider 206 may perform verified liveliness authentication to verify the biometric submitted by the consumer (216). The verification may include that (i) the biometric submitted by the consumer provides affirmative proof of identity for the consumer; and (ii) the biometric submitted by the consumer on-line is fresh and live and not is being forged, for example, in a spoofing attempt.

As an initial matter, the server at identity provider 206 may retrieve, for example, a facial biometric from the data submitted by consumer 202. The retrieved facial biometric may be sent, from a computing device of consumer 202 to the server at identity provider 206, in an encrypted format based on an encryption algorithm. Here, the computing device of consumer 202 may include a video input component to provide a video feed. In some instances, the video input component includes a webcam. The images in the video feed may be captured at a frame rate of, for example, 24 frames per second. The frames generally are digitized for digital processing. In some instances, the images may be at a spatial resolution of, for example, 800×600 pixels, 1024× 768 pixels, 1152×864 pixels, or 1280×1024 pixels.

The server at identity provider 206 may then compare the retrieved facial biometric with biometric identity data of consumer 202. The biometric identity data of consumer 202 may be pre-stored at the server at identity provider 206. The comparison may be conducted in a manner consistent with the context-dependent rigidity requirement of the authentication. For example, if the amount in transaction is less than a particular threshold, such as $50, then the degree of matching between the facial biometric as submitted by consumer 202 on-line and the pre-stored facial biometric at the server at the identity provider 206 may be reduced. On the other hand, however, if the amount in transaction is higher than a particular threshold, such as, for example, $1,000, then the degree of matching between the facial biometric as submitted by consumer 202 on-line and the pre-stored facial biometric at the server at the identity provider 205 may be heightened. In a related example, if the transaction is in the nature of a mortgage application, a credit card application, the degree of matching may also be heightened. A scoring mechanism may be implemented to generate a score to quantify the degree of resemblance between the facial biometric as submitted by consumer 202 on-line and the pre-stored facial biometric at the server of identity provider 206. The score of resemblance may be used by the server at identity provider 206 to determine whether the retrieved facial biometric as submitted by consumer 202 on-line is sufficient to prove that the submitting consumer 202 is the person whose biometric data is stored at the server of identity provider 206.

Further, the server at identity provider 206 may determine whether the retrieved facial biometric being submitted by consumer 202 on-line is a live facial biometric. One risk associated with on-line authentication has been the prospect of a man-in-the-middle attack. For example, during spoofing, a third party may impersonate consumer 202 by replaying an authentication proof as submitted by consumer 202 earlier and was obtained by the third party. Some encryption mechanism may counter the man-in-the-middle threat by refreshing or updating the encryption key used to encrypt the stream of communication sessions between consumer 202 and identity provider 206. Generally, however, such encryption mechanism may not address the staleness of the biometric data itself. In other words, some encryption mechanism may be inadequate if a third party obtains an instance of the biometric data and attempts to replay the instance of biometric data to gain access to the account of consumer 202. Such risks may be amplified with the combination of username and password login because the text strings for username and password may not be refreshed at the granularity of each login session. Specifically, refreshing username and password for each login session (or at a sub-session level at, for example, every few seconds) may not be practical.

Some implementations as disclosed herein may verify the liveliness of the biometric data as submitted by consumer 202, for example, by verifying facial liveliness of consumer 202. In some implementations, the server at identity provider 206 performs liveliness verification based on the submitted video feeds (or images). In some implementations, a computing device associated with consumer 202 performs liveliness verification based on the captured video feeds (or images) and submits a result of liveliness verification to the server at identity provider 206, e.g., together with the biometric data. The server at identity provider 206 can then determine whether the submitted biometric data is a live facial biometric based on the submitted result of liveliness from the computing device associated with consumer 202. In some implementations, a computing device associated with relying party 204 or identity provider 206 that obtains video feeds (or images) from a camera device local to consumer 202, performs liveliness verification based on the captured video feeds (or images) and submits a result of liveliness verification to the server at identity provider 206, e.g., with the biometric data.

Figure 3:
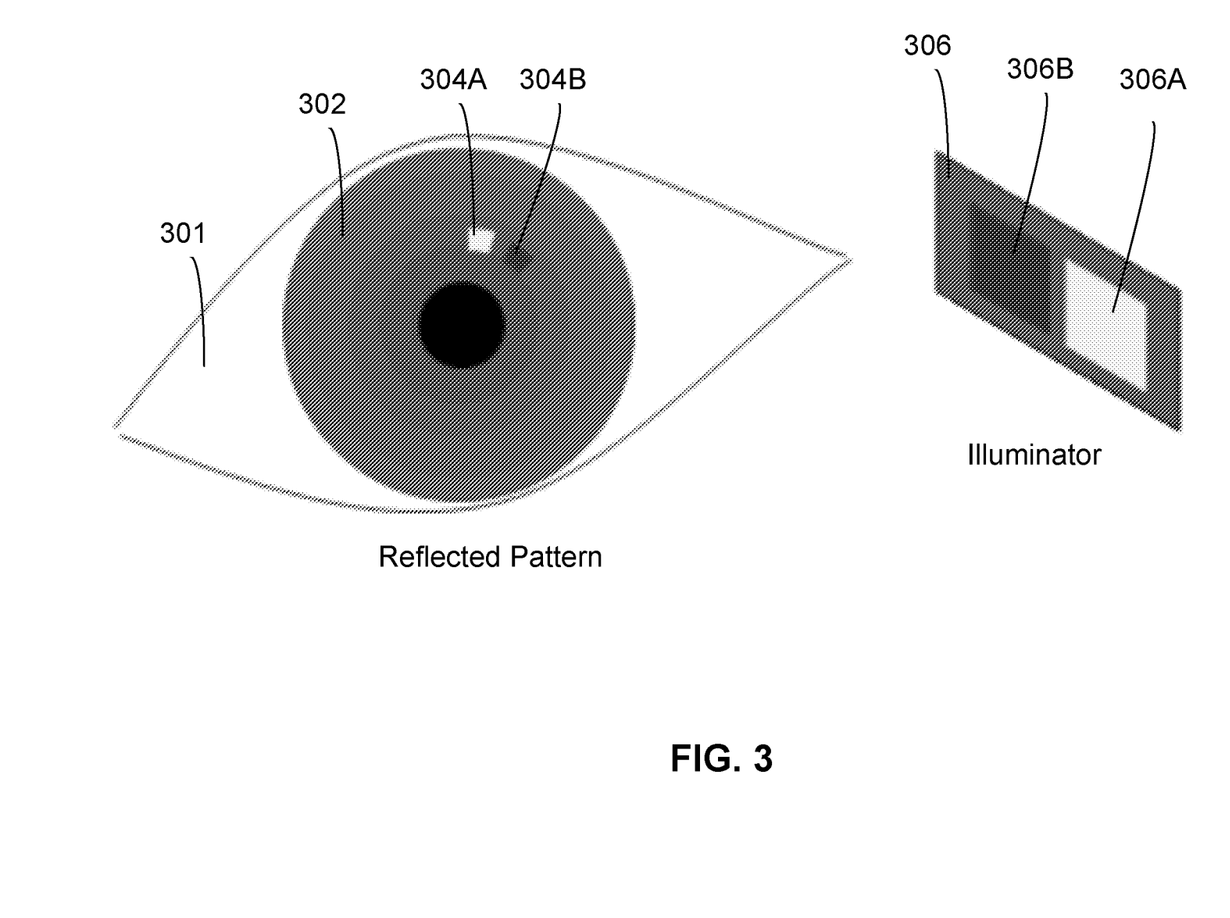
FIG. 3 is a diagram showing an example verification based on corneal reflection from illumination sources.

In some implementations, liveliness verification includes analysis of a corneal reflection from consumer 202. Initially, the face of consumer 202 may be detected. Referring to FIG. 3, the eye 301 of consumer 202 may then be detected in a video feed (or an image). Generally, such detections include segmentation techniques that leverage face or eye template data. Such template data may be morphed through various shape transforms to identify face or eye area in a video feed. Once eye 301 is detected, cornea region 302 may then be determined in the video feed. Reflections of illuminations on the corneal region in the video frame may then be analyzed.

First, illuminator 306 adjacent to consumer 202 may be activated. For example, illuminator 306 can be activated in response to determining that consumer 202 chooses a verified liveliness login for biometric authentication, e.g., 210 of FIG. 2A. As an example, illuminator 306 in FIG. 3 includes illumination source 306A and illumination source 306B with two distinct colors (e.g., blue or red). An illumination source can be a physical light source or a digital illumination source. In some implementations, illuminator 306 includes physical light sources, e.g., light-emitting diodes (LEDs) or light lamps. Illuminator 306 may include one or more light sources at distinct light wavelengths thus with one or more distinct colors. In some implementations, illuminator 306 includes one or more digital illumination sources displayed on a screen, e.g., on a laser-powered phosphor display (LPD), a liquid-crystal display (LCD) screen, a light-emitting diode (LED) screen such as an active matrix organic LED screen, or any suitable display screen. A digital illumination source can be a digital color pattern displayed on a screen, e.g., a LCD screen of a mobile device. The digital illumination sources can be provided by an application (or an App) installed on a computing device of consumer 202 or provided by the server at identity provider 206, e.g., in a user interface displayed on the computing device of consumer 202. In some implementations, illuminator 306 includes one or more physically light sources and one or more digital illumination sources.

Illuminator 306 may be included or displayed on a consumer electronic device, such as a smartphone, a mobile phone, a mobile computing device, or a desktop computer, from which consumer 202 attempts to authenticate his or her identity and liveliness. Illuminator 306 may be included on the console of an automatic teller machine (ATM) of a relying party or adjacent to the ATM. A computing device associated with the relying party or identity provider 206 may be configured to control illuminator 306. Consumer 202 may attempt to authenticate his or her identity and liveliness through the computing device.

Once activated, illuminator 306 may illuminate consumer 202. The illumination from illuminator 306 can be straight to the eye of consumer 202 or to the eye of consumer 202 with an incident angle. In some examples, illuminator 306 is positioned so that the illumination from illuminator 306 is incident on the eye of consumer 202 with an angle. In some examples, consumer 202 can be prompted to move illuminator 306 (e.g., a flashlight on his/her smartphone) to a side of the face (or eyes) or move his/her face (or eyes) so that the illumination from illuminator 306 is incident on the eye of consumer 202 with an angle.

Information of the illumination (e.g., a position, a shape, a duration, a color or wavelength, or an illumination pattern) can be known or predetermined. In some examples, a computing device of consumer 202 performs liveliness verification. The information of illumination can be known to the computing device but unknown to consumer 202 (or would-be hackers as man in the middle) beforehand. The information of illumination can be generated by the computing device or provided by the server at identity provider 206.

The corneal reflection immediately following the activation of illuminator 306 may be captured, e.g., by a camera device adjacent to consumer 202. The camera device can keep capturing facial images of consumer 202 before, during, and after the activation of illuminator 306. In some examples, the captured image frame may be analyzed to ascertain whether the corneal reflection is in agreement with the expected (known or predetermined) illumination. In analyzing the corneal reflections, the position, shape, and color/wavelength of the reflected illumination in the cornea of consumer 202 may be detected and compared to the expectation illumination. In one example, the position of the corneal reflection, for example, reflection spot 304A or 304B may be correlated with the position of illumination sources 306A or 306B. In another example, the shape of the reflection spot 304A or 304B may be compared to the shape of illumination sources 306A or 306B. In yet another example, the wavelength (or color) of reflected light from reflection spot 304A or 304B may be compared to the wavelengths (or colors) of illumination sources 306A or 306B.

In some examples, illumination pattern by illuminator 306 (e.g., an illumination source 306A or 306B) may be modulated over time to form a temporal illumination pattern. For example, illumination source 306A may generate illumination in bursts, each burst with a same or different temporal duration. For example, a first temporal duration can be 1 second and a second temporal duration can be 2 seconds. The temporal illumination pattern can also include a change in illumination shape, e.g., varying between a square shape, a triangle shape, and/or a circle shape, and/or a change in illumination color, during different temporal durations or at different time points. In one example, illuminator 306 provides a red square at a first temporal duration, a red circle at a second temporal duration, no illumination at a third temporal duration, and a blue triangle at a fourth temporal duration. The corneal reflection in captured sequential images may be analyzed to determine whether the corneal reflection contains the same temporal pattern. The corneal reflection in captured sequential images can be also individually analyzed to determine whether the corneal reflection in the captured sequential images matches the individually expected corneal reflections of the illuminator 306. Determination of facial liveliness of consumer 202 can be based on the match results of the captured sequential images.

In some examples, illumination pattern by two or more illumination sources (e.g., illumination sources 306A and 306B) may be modulated over time to form a temporal illumination pattern. The illumination sources can illuminate same or different colors. For example, illumination sources 306A and 306B may generate illumination in bursts, each with a same or distinct temporal duration and/or each with a same or different distinct illumination shape during the temporal duration. In an example, at a first time point, illumination source 306A illuminates a red square and illumination source 306B illuminates a blue square. At a second time point, illumination source 306A illuminates a red circle and illumination source 306B illuminates a blue square. At a third time point, illumination source 306 illuminates a red circle and illumination source 306 illuminates a blue circle. At a fourth time point, illumination source 306 illuminates a red rectangle and illumination source 306 illuminates a red circle. The corneal reflection in sequential images may be analyzed to determine whether the corneal reflection contains the same temporal pattern.

In some examples, the illumination pattern by two or more illumination sources (e.g., illumination sources 306A and 306B) may be modulated spatially to form a spatial illumination pattern. For example, illumination sources 306A and 306B may be activated to illuminate cornea 302 in an interleaved manner. Generally, the illumination pattern from illumination sources 306A and 306B may be varied by turning on or off illumination source 306A, illumination source 306A, or the combination of illumination sources 306A and 306B at different time points. In response, the corneal reflection may be analyzed to determine whether the reflection contains the same spatial pattern of illumination. As discussed herein, the temporal and spatial aspects of illumination may be combined to further buttress the variety of matches that improves the confidence of a liveliness authentication session.

Initially, the images in response to activated illumination may be captured in a video stream at a full frame rate (for example, as determined by Nation Television System Committee—NTSC, or as determined by the video communication standard H.261). In some implementations, as noted above, the server at identity provider 206 performs liveliness verification based on the captured video stream. For efficiency of communication, only a portion of the captured video stream may be transmitted, for example, in accordance with adaptive video codec specification of H.261. When corneal reflections are expected to change, the video stream may be digitalized and transmitted to the server at identity provider 206 at a rate faster than a floor-level rate (when consumer 202 remains stationary). In fact, the transmitted video stream may be analyzed by the server at identity provider 206 to determine whether the changes in corneal reflections of the video stream from consumer 202 matches the known changes in illumination of illuminator 306 or whether the corneal reflections of video frames at particular time points matches the expected corneal reflections based on known illuminations of illuminator 306 at the particular time points.

Similar to facial authentication, a scoring mechanism may be implemented to quantify the degree of match between the response corneal reflection being received at the server of the identity provider 206 in the captured images and the expected illumination (e.g., position, shape, and wavelength or color, or temporal and/or spatial pattern). The degree of match may depend on the context and hence can vary from application to application. For example, the degree of match may depend on the nature of the underlying transaction or the dollar amount involved in the underlying transaction.

In some implementations, a computing device receives the captured video stream, e.g., by a camera device included in or coupled to the computing device, and performs liveliness verification based on the captured video stream. The computing device can be a computing device of consumer 202 from which consumer 202 attempts to authenticate his or her identity and liveliness. For example, the computing device can be a smartphone which includes a flashlight as illuminator 306 and a camera as the camera device. A mobile app installed on the smartphone can also provide one or more digital illumination sources as illuminator 306. The flashlight and the digital illumination sources can be combined to be used as illuminator 306. The computing device can control illuminator 306 to illuminate based on a predetermined or known illumination pattern. The illumination pattern can be generated by the computing device or transmitted from the server at identity provider 206. The illumination of illuminator 306 can be also measured by a detector that provides the measured illumination to the computing device. The known illumination of illuminator 306 can be stored in the computing device. The computing device can also control the camera device to capture a video stream during activation of the illumination pattern of illuminator 306. In some other implementations, the computing device is associated with relying party or identity provider 206.

As the camera device is local to the computing device, the transmission of the captured video stream (e.g., a portion) can be fast. The computing device can analyze the transmitted video stream to determine the illumination (or illumination changes) in corneal reflections of the video stream (e.g., sequential video frames) matches the known illumination (or illumination changes) of illuminator 306. The computing device can use a scoring mechanism to quantify the degree of match between the response corneal reflection in the captured images and the expected illumination. The degree of match may depend on the context and hence can vary from application to application. Based on the scored match, the computing device can verify facial liveliness of consumer 202. The computing device can then submit the result of the verification to the server at identity provider 206, e.g., together with biometric data of consumer 202. Then the server at identity provider 206 can seamlessly determine whether the submitted biometric data is a live facial biometric of consumer 202 based on the submitted result of the verification from the computing device.

Implementations disclosed herein detect corneal reflections in response to illuminations, including illumination patterns temporally and/or spatially. Corneal reflection may proffer benefits as non-intrusive and capable of handling a wide band of operations (for example, from infra-red to visible light). Particularly, corneal reflection tends to be more specular than skin reflections, which tend to be more scattered. Implementations disclosed herein may not include verbal directives to prompt consumer 202 to change facial gestures or other bodily positions. Some implementations disclosed herein can detect liveliness seamlessly and without user awareness and input. For example, activation of an illumination pattern and capturing sequential images can be performed without user's notice, e.g., when facial biometric of a consumer is captured. The liveliness verification can be also completed during capturing facial biometric, e.g., by a computing device of consumer 202. The stealth feature can be leveraged to further isolate liveliness detection from an on-line identity management session.

Some implementations may additionally include a biometric recognition feature to authenticate consumer 202. By way of example, server at identity provider 206 may conduct a facial recognition to compare the facial biometric of an enrolled consumer with the facial biometric of consumer 202 submitting the authentication request. If the comparison yields a matching result, the facial recognition may prove that consumer 202 is the person whose facial biometric is stored at the server at identity provider 206. In other examples, the biometric recognition may include voice recognition, speaker recognition, gait analysis, etc.

Referring back to FIG. 2A, after verifying that consumer 202 is alive and is the person whose biometric has been stored at identity provider, server at identity provider 206 may provide a signal that authentication is successful. If, however, consumer 202 cannot be verified as alive or as the person whose biometric has been stored at identity provider 206 in association with the account at relying party 204, server at identity provider 206 may provide a signal that authentication has failed. The signal may be embedded in a message to consumer 202 to redirect consumer 202 back to relying party 204 (218).

Consumer 202 may then return to the relying party 204 (220). If the embedded signal indicates that the verification is successful, consumer 202 may proceed to access the account at relying party 204. In returning to relying party 204, consumer 202 may attach a success signal backed up by a credential of identity provider 206. The credential of the identity provider 206 may include, for example, a digital private key of identity provider 206, a digital watermark of identity provider 206. If, however, the embedded signal indicates that the verification has failed, consumer 202 may not access the account at relying party 204. Moreover, consumer 202 may not even be redirected back to the relying party 204.

Figure 2B:
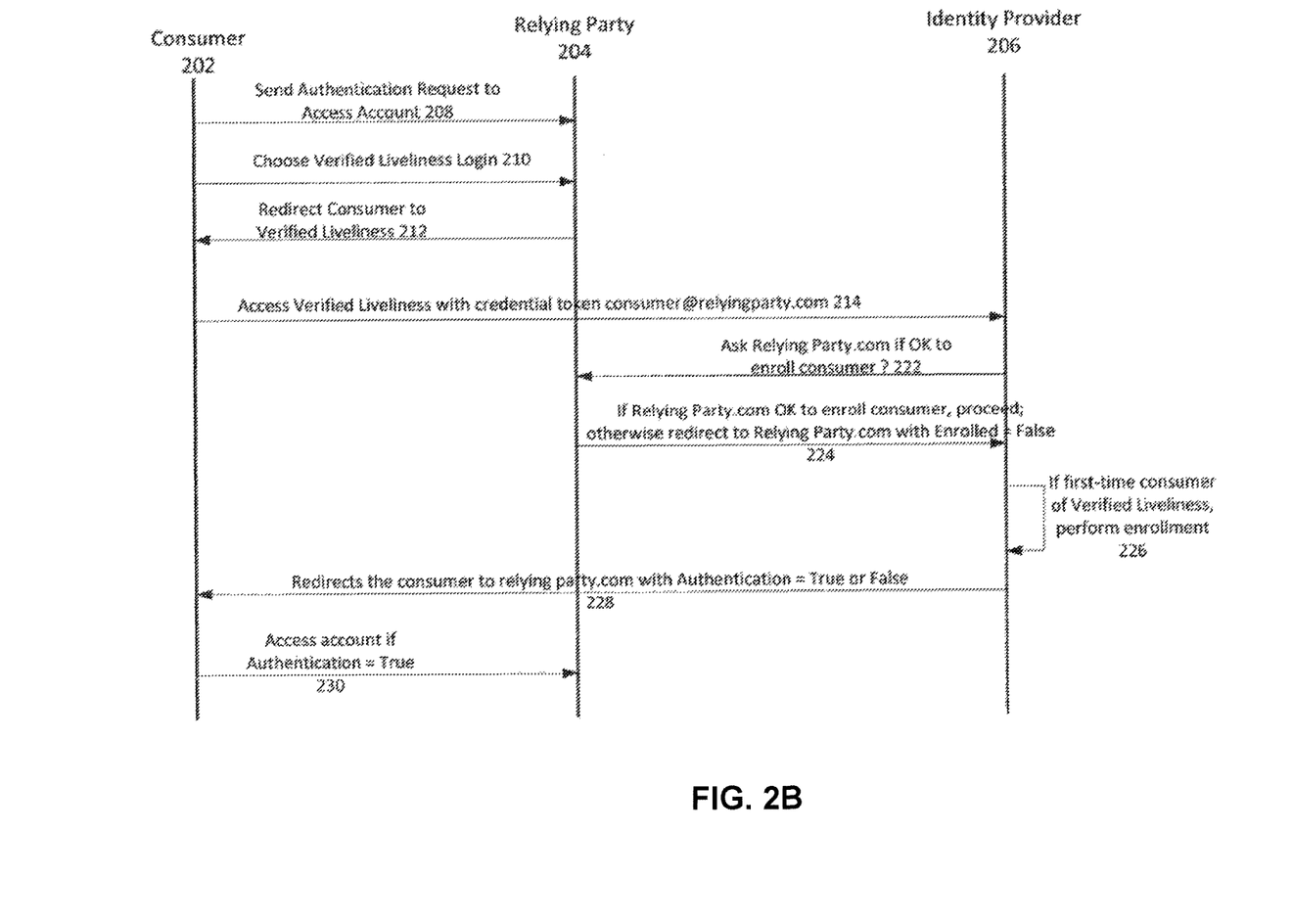
FIG. 2B is a timing diagram showing an example interaction among a consumer, a relying party, and an identity provider in authenticating the consumer when the consumer has not yet enrolled at the identity provider according to some implementations.

FIG. 2B is a timing diagram showing an example interaction among a consumer, a relying party, and an identity provider in authenticating the consumer when the consumer has not yet enrolled at the identity provider according to some implementations. As discussed above in association with FIG. 2A, the process may initiate with consumer 202 send an authentication request to access an account managed by relying party 204 (208). In some implementations, the submission of the authentication request may correspond to consumer 202 choosing biometric authentication 102 to access an account managed by, for example, a financial institution. When the consumer submits the authentication request, the consumer may also choose to a verified liveliness login for biometric authentication (210), in response to receiving the consumer choice of verified liveliness login, a server at the relying party may redirect consumer to proceed with verified liveliness (212). Thereafter, consumer 202 may be redirected to a server at the identity provider 206. For example, consumer 202 may submit a request to use verified liveliness by using a credential token in the form of consumer@relying_party.com (214). As illustrated in FIG. 2B, the request may be submitted at a server at identity provider 206.

The server at identity provider 206 may notice that consumer 202 has not yet registered for the verified liveliness service at identity provider 206. In response, the server at identity provider 206 may inquire the server at the relying party 204 whether the identity provider 206 may enroll consumer 202 in the verified liveliness service, as requested by consumer 202. Some relying parties may financially compensate identity provider 206 for the verified liveliness. In turn, these relying parties may stratify consumers into various classes with corresponding account benefits. By way of illustration, consumers with holdings above a threshold value of, for example, $50 k may have the verified liveliness service as a complimentary service. Consumers with less account value or shorter membership history may need to pay a fee to relying party 204 in order to have the verified liveliness service.

Upon determination that consumer 202 may enroll in the verified liveliness service, server at relying party 204 may indicate to the server at identity provider 206 that the enrollment for consumer 202 may proceed (224). If, however, server at relying party 204 determines that consumer 202 may not enroll in the verified liveliness service, server at relying party 204 may inform the server at identity provider 206 that consumer 202 does not have permission to enroll in the requested service and the server at identity provider 206 may drop the enrollment request initiated from consumer 202. Particularly, server at identity provider 206 may direct consumer 202 back to relying party 204 with the flag that enrollment has failed (224).

If the server at identity provider 206 receives confirmation that identity provider 206 may proceed with enrolling consumer 202, server at identity provider 206 may administer an enrollment procedure for consumer 202 (226). Specifically, identity provider 206 may request consumer 202 to register a biometric. The biometric may include, for example, a facial biometric, a finger-print, a palm-print, an iris scan, a retina scan. In the case of a facial biometric, server at identity provider 206 may request consumer 202 to pose in front of, for example, a web camera, a video camera, or a smart-phone camera. The camera device may reside on, for example, a computing device of consumer 202. The computing device may initially transmit a capture frame to server at identity provider 206. This captured frame may be stored at identity provider 206 as biometric information identifying consumer 202. To counter man-in-the-middle attacks, server at identity provider 206 may then leverage corneal reflection changes from consumer 202. By way of example, server at identity provider 206 may verify the liveliness of the enrollment session as discussed above in association with FIG. 2A and FIG. 3.

Consistent with the disclosure herein, server at identity provider 206 may also initiate illumination patterns on consumer 202 to increase the confidence level that a live consumer is attempting to enroll in the service. As discussed herein, multiple illumination patterns for different and separate spatial and temporal modulations may obviate the ambiguities associated with a single illumination response. For example, when consumer 202 may not be responding to the fullest extent as expected from one single illumination, or when sampling error during video transmission may have missed the frame that contains the exact response reflection, a single response illumination may be insufficient to determine with confidence that consumer 202 is a live person attempting to enroll in the service.

When consumer 202 has been determined as a live person and has been enrolled in the verified liveliness service, the server at identity provider 206 may redirect consumer 202 back to relying party 204 with a signal that the authentication is successful (228). If consumer 202 has been successfully enrolled in the program, the server at identity provider 206 may provide a signal that the authentication has succeeded. If, however, consumer 202 cannot be verified as alive or as the person and cannot be enrolled in the verified service program, the server at identity provider 206 may provide a signal that authentication has failed. The signal may be embedded in a message to consumer 202 to redirect consumer 202 back to relying party 204 (218).

Consumer 202 may then return to the relying party 204 (230). If the embedded signal indicates that the authentication has succeeded, consumer 202 may proceed to access the account at relying party 204. In returning to relying party 204, consumer 202 may attach a success signal backed up by a credential of identity provider 206. The credential of the identity provider 206 may include, for example, a digital private key of identity provider 206, a digital watermark of identity provider 206. If, however, the embedded signal indicates that the authentication has failed, consumer 202 may not access the account at relying party 204. Moreover, consumer 202 may not even be redirected back to the relying party 204.

Notably, in some implementations, a first-time enrollee may be sent to the server at identity party 206 after the first-time enrollee has successfully logged into an account of the first-time enrollee at the relying party 204. The enrollment may provide consumers with additional security features to guard against spoofing attacks. The security features may also include biometric recognition, as detailed above. In fact, some configurations may use the biometric recognition as a form of password authentication. In other words, the biometric recognition may be used as a surrogate for the password login.

In some implementations, however, identity provider 206 may obtain a database for a number of consumers attempting to enroll in a verified liveliness program. During the enrollment process, the server at identity provider 206 may collect a biometric from a consumer attempting to enroll. After verifying that the consumer is a live person making a legitimate enrollment request, the server at identity provider 206 may enroll the consumer. Hence, in some implementations, the server at identity provider 206 may have a copy of a digital biometric of consumer 202 when consumer 202 has been redirected from relying party 204. When a copy of the digital biometric of consumer 202 is available, the server at identity provider 206 may only need to determine that consumer 202 is a live person.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media (transitory or non-transitory, as appropriate) suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for detecting facial liveliness, comprising:
processing, by one or more processors, first and second images associated with a face of a subject to determine first and second corneal reflections of an illuminator adjacent to the subject, the first and second images being captured at first and second sequential time points, respectively;
determining, by the one or more processors, a corneal reflection change of the illuminator based on the determined first and second corneal reflections;
comparing, by the one or more processors, a correlation between the determined corneal reflection change of the illuminator and an illumination change of the illuminator associated with the first and second sequential time points to a threshold determined based on a varying context-dependent requirement; and
determining, by the one or more processors and based on a result of the comparison, facial liveliness of the subject.

2. The method of claim 1, wherein determining facial liveliness of the subject comprises:
determining that the face of the subject is live in response to determining that the correlation is beyond the determined threshold.

3. The method of claim 1, further comprising:
activating the illuminator to change illumination of the illuminator based on the illumination change.

4. The method of claim 3, further comprising:
generating the illumination change for the illuminator.

5. The method of claim 3, wherein activating the illuminator comprises:
activating the illuminator in response to determining that the subject chooses to use liveliness verification for biometric authentication.

6. The method of claim 1, wherein the illumination change of the illuminator comprises at least one of:
an illumination color change, an illumination shape change, an illumination position change, an illumination on/off state change, or an illumination temporal duration change.

7. The method of claim 6, wherein determining a corneal reflection change of the illuminator comprises:
determining a change of the corneal reflection of the illuminator in at least one of: color, shape, position, on/off state, or temporal duration.

8. The method of claim 1, wherein the illuminator comprises first and second illumination sources with first and second colors and at first and second positions, respectively.

9. The method of claim 8, wherein the illumination change of the illuminator comprises a change of a temporal illumination pattern of the first and second illumination sources.

10. The method of claim 9, wherein the first and second illumination sources generate illumination in bursts each with respective temporal durations.

11. The method of claim 9, wherein at least one of the first illumination source or the second illumination source changes an illumination shape for different temporal durations.

12. The method of claim 8, wherein the illumination change of the illuminator comprises a change of a spatial illumination pattern of the first and second illumination sources over time.

13. The method of claim 12, wherein at least one of the first illumination source or the second illumination source changes an illumination on/off state over time.

14. The method of claim 1, wherein the illuminator includes one or more physical light sources each at respective light wavelengths.

15. The method of claim 1, wherein the illuminator includes one or more digital illumination sources displayed on a screen to provide respective illumination colors.

16. The method of claim 15, further comprising:
generating the one or more digital illumination sources.

17. The method of claim 1, wherein the first image includes a representation of a first corneal region of the subject that has the first corneal reflection of the illuminator, and the second image includes a representation of a second corneal region of the subject that has the second corneal reflection of the illuminator.

18. The method of claim 1, further comprising:
transmitting, to a computing device at identity provider, an authentication request of the subject for accessing an account managed by a relying party different from the identity provider, the authentication request including biometric data of the subject and the determined facial liveliness of the subject.

19. The method of claim 18, further comprising processing the first and second images associated with the face of the subject to determine the biometric data of the subject,
wherein the biometric data of the subject is configured to provide affirmative proof of identity for the subject.

20. A method of detecting facial liveliness by a mobile phone, the method comprising:
determining that a subject chooses to use liveliness verification for facial biometric authentication;
activating an illuminator to illuminate, the illuminator being adjacent to the subject;
capturing, by a camera of the mobile phone, first and second images associated with a face of the subject at first and second sequential time points, respectively, each of the first and second images including a representation of a respective corneal region of the subject that has a respective corneal reflection of the illuminator;
processing the first and second images to determine facial biometric data of the subject and respective first and second corneal reflections of the illuminator;
determining a corneal reflection change of the illuminator based on the determined first and second corneal reflections;
comparing a correlation between the determined corneal reflection change of the illuminator and an illumination change of the illuminator associated with the first and second sequential time points to a threshold determined based on a varying context-dependent requirement;
determining facial liveliness of the subject based on a result of the comparison; and
transmitting, to a computing device at an identity provider, an authentication request of the subject for accessing an account managed by a relying party associated with an entity different from the identity provider, the authentication request including:
the facial biometric data of the subject for proof of identity of the subject, and
the determined facial liveliness of the subject for verification that the transmitted facial biometric data of the subject is fresh and live.

\* \* \* \* \*